United States Patent
Andtsjö

(10) Patent No.: US 7,816,465 B2
(45) Date of Patent: Oct. 19, 2010

(54) PROCESS FOR PRODUCING POLYETHYLENE

(75) Inventor: Henrik Andtsjö, Porvoo (FI)

(73) Assignee: Borealis Technology Oy, Porvoo (FI)

( * ) Notice: Subject to any disclaimer, the term of this patent is extended or adjusted under 35 U.S.C. 154(b) by 939 days.

(21) Appl. No.: 10/592,638

(22) PCT Filed: Apr. 28, 2005

(86) PCT No.: PCT/FI2005/000201
§ 371 (c)(1),
(2), (4) Date: Jan. 16, 2007

(87) PCT Pub. No.: WO2005/105861
PCT Pub. Date: Nov. 10, 2005

(65) Prior Publication Data
US 2008/0045674 A1    Feb. 21, 2008

(30) Foreign Application Priority Data
Apr. 29, 2004   (EP) .................................. 04396033

(51) Int. Cl.
*C08F 2/00* (2006.01)
*C08F 110/02* (2006.01)
*B01J 19/18* (2006.01)

(52) U.S. Cl. .................... 526/64; 526/352; 422/132

(58) Field of Classification Search .................... 526/64, 526/352; 422/132
See application file for complete search history.

(56) References Cited

U.S. PATENT DOCUMENTS 5,326,835 A * 7/1994 Ahvenainen et al. .......... 526/64

FOREIGN PATENT DOCUMENTS

| EP | 1 415 999 A1 | 5/2004 |
| EP | 1 415 999 A1 * | 5/2004 |

* cited by examiner

*Primary Examiner*—William K Cheung
(74) *Attorney, Agent, or Firm*—Birch, Stewart, Kolasch & Birch LLP

(57) ABSTRACT

Process and apparatus for continuously producing olefin polymers in a slurry phase reactor in a hydrocarbon diluent or liquid monomer. The process comprises continuously withdrawing from the slurry phase reactor a polymer slurry containing polymer and a fluid phase, which contains hydrocarbons and optionally hydrogen, and concentrating the slurry with a self-cleaning screen by removing a part of the fluid phase to provide a concentrated slurry. The openings of the screen, which can have a planar or cylindrical configuration, are smallest at the inflow surface of the screen and increases towards the outflow surface. By the present invention, the need for service and maintenance is significantly reduced.

18 Claims, 4 Drawing Sheets

PROCESS FOR PRODUCING POLYETHYLENE

This Application is the National Phase Under 35 U.S.C. § 371 of PCT International Application No. PCT/FI2005/000201 which has an International filing date of Apr. 28, 2005, which claims priority to European Patent Application No. 04396033.5 filed on Apr. 29, 2004. The entire contents of all applications listed above are hereby incorporated by reference.

BACKGROUND OF THE INVENTION

1. Field of the Invention

The present invention relates to olefin polymerisation. More specifically, the present invention concerns a process for continuously polymerising olefins, such as ethylene and/or propylene, optionally together with $C_4$ to $C_{12}$ alpha-olefins, in slurry phase in the presence of a polymerisation catalyst. The invention also concerns a method of continuously withdrawing polymer slurry from the reactor and concentrating the slurry.

2. Description of Related Art

Slurry processes for polymerising olefins are known since the development of Ziegler catalysts in 1950's. The particle form process of Phillips, where ethylene was polymerised in the presence of a chromium catalyst in a loop reactor at elevated pressure and temperature, was developed at the same time.

It is common to concentrate the slurry that is or has been withdrawn from the reactor. Earlier, this was done by withdrawing the slurry via settling legs. These are vertical pipes where the slurry is allowed to settle. When a valve connected to the lower end of the settling leg is opened, the settled slurry is withdrawn from the reactor. The valve is then closed and a new portion of slurry is allowed to settle. The disadvantage of the settling legs is that they operate intermittently and lead to a pulsating product flow.

It is also known that hydrocyclones can be used for concentrating the slurry withdrawn from the reactor. Such processes are disclosed, e.g., in U.S. Pat. No. 3,816,383, U.S. Pat. No. 4,395,523 and EP 1 118 624. The particular advantage of hydrocyclones is that they can be used in a truly continuous manner. Although hydrocyclones are mechanically relatively simple, the high pressure employed and reactivity of the slurries make instrumentation and piping around the hydrocyclones somewhat complicated, which increases investment costs.

There is therefore still a need for a process, which makes it possible to concentrate the polymer slurry withdrawn from the reactor in a simple and economic way.

SUMMARY OF THE INVENTION

It is an object of the invention to provide a method of concentrating a slurry stream withdrawn from a polymerisation reactor by using process equipment having low investment and operating costs. Further, it is an object of the invention to provide a method that allows for reliable and problem-free operation of the polymerisation process. It is also an object to provide apparatus for polymerising olefins, like ethylene and/or propylene, optionally together with $C_4$ to $C_{12}$ alpha-olefins, in slurry phase in the presence of a polymerisation catalyst, which apparatus allows for continuously withdrawing polymer slurry from the reactor and concentrating the slurry.

These and other objects, together with the advantages thereof over known methods and apparatuses which shall become apparent from the specification, which follows, are accomplished by the invention as hereinafter described and claimed.

The present invention is based on the idea of using a screen as a concentrating device of polymer slurry containing polymer particles dispersed in a hydrocarbon diluent. Thus, according to the present invention, the polymer slurry withdrawn from a bulk reactor is passed over a screen in such a manner that at least a part of the fluid passes through the screen, whereat at least the main portion of the polymer particles is retained on the screen. The fluid phase is returned to the polymerisation reactor. It may contain a minor amount of polymer particles having a small particle size. The remaining part of the fluid, together with the major part of the polymer, is withdrawn from the reactor as a product stream.

An apparatus operating according to the invention therefore comprises, in combination:

a bulk reactor for polymerizing olefins, with at least one inlet for reactive olefins and an outlet for polymer slurry; and a screen unit having a self-cleaning screen with an inflow surface and an outflow surface, dividing the screen unit into a first compartment for polymer slurry and a second compartment for essentially polymer particle-free effluent, said screen unit further having an inlet for polymer slurry and a first outlet for concentrated slurry connected to the first compartment, and a second outlet for polymer particle-free effluent connected to the second compartment.

The apparatus may comprise separate conduits, viz. a first conduit, which connects the outlet of the bulk reactor to said inlet of the screen unit, and a second conduit, which connects the second outlet of the screen unit to an inlet to the bulk reactor, although it is equally possible to build in the screen unit into the slurry reactor.

More specifically, the process according to the present invention is mainly characterized by what is stated in the characterizing part of claim 1.

The apparatus according to the present invention is characterized by what is stated in the characterizing part of claim 11.

Considerable advantages are obtainable by the present invention. Thus, the use of a screen significantly simplifies the construction and operation of the apparatus. The screen unit can be mounted in the vicinity of the loop reactor or even inside it to provide for a compact construction. By using a self-cleaning screen, the need for service and maintenance work is reduced; when the slot openings are chosen so that the smallest particles are partly recycled with the diluent back to the loop reactor, high velocity on the pressure side of the inflow surface of the screen prevents clogging of the screen slots. The larger cross-section slot area on the discharge side of the screen minimises the risk of particles adhering to the openings.

Further features and advantages of the invention will appear from the following detailed description.

DETAILED DESCRIPTION OF THE INVENTION

Figure 1:
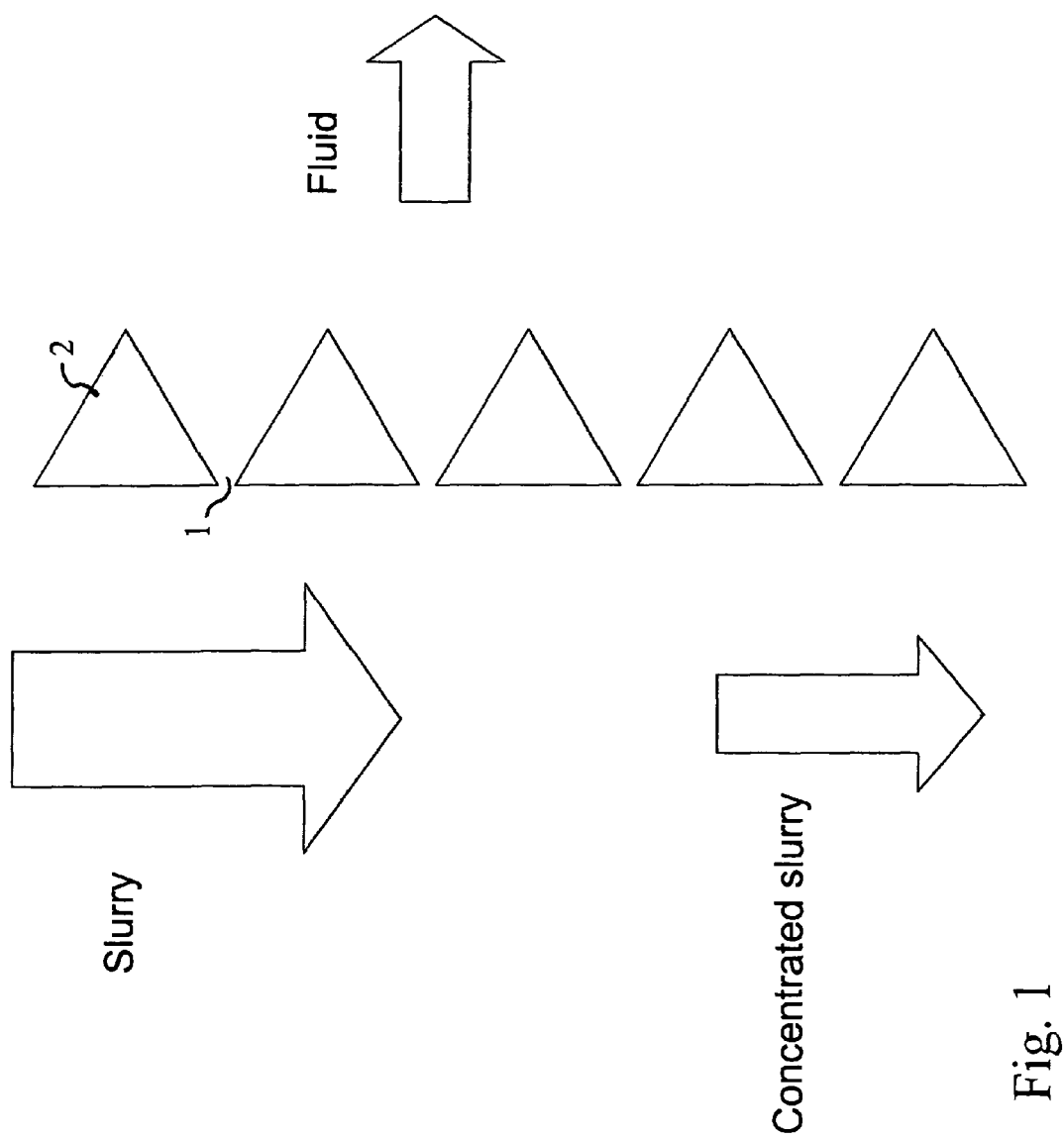
FIG. 1 illustrates in a schematic fashion the operation of a self-cleaning screen.

Basically, the present process for the production of polyolefins in the presence of a catalytic system comprises the steps of:
continuously polymerizing olefin monomers in a slurry phase reactor in a hydrocarbon diluent or liquid monomer;
continuously withdrawing from the slurry phase reactor a polymer slurry containing polymer and a fluid phase, which contains hydrocarbons and optionally hydrogen; and
concentrating the slurry with a self-cleaning screen by removing a part of the fluid phase to provide a concentrated slurry.

According to a specific embodiment, the present process comprises
continuously introducing at least one olefin, a polymerisation catalyst, and optionally an inert diluent and hydrogen into at least one polymerisation reactor, preferably a slurry reactor, in particular a loop reactor;
continuously polymerising said at least one olefin in said reactor;
continuously withdrawing a polymer slurry stream comprising fluid and polymer particles from said reactor;
passing said withdrawn polymer slurry stream into a process step involving at least one screen, thereby dividing said polymer slurry stream into two streams, where the first stream comprises the concentrated slurry and the second stream comprises mainly fluid, optionally with a minor amount of polymer;
returning at least a part of said second stream into at least one polymerisation reactor; and
optionally recycling a part of the concentrated stream to the reactor.

The slurry polymerisation may be conducted in the presence of an inert diluent, but it may also be conducted in a liquid monomer. When ethylene is predominantly polymerised or copolymerised with another alpha-olefin, an inert diluent is preferably used. The inert diluent may be any hydrocarbon, which is not reactive in polymerisation conditions. Preferably the diluent is a $C_1$ to $C_{10}$ hydrocarbon or a mixture of such hydrocarbons. In particular, the diluent is a $C_3$ to $C_{10}$ hydrocarbon or their mixture. Especially, the diluent is propane, n-butane, isobutane, pentane or hexane. It is worth mentioning that in addition to the main component, the diluent may contain minor amounts of other components. Thus, a propane diluent may contain n-butane, isobutane, butanes, propylene, ethane, methane, ethylene etc. However, the total of such other components does not typically exceed 10% by weight.

The temperature of the slurry in the reactor may range from 20 to 110° C., preferably from 50 to 100° C. and more preferably from 70 to 100° C. The pressure may range from 5 to 100 bar, preferably from 20 to 90 bar and more preferably from 30 to 80 bar.

Sometimes it is preferred to conduct the slurry polymerisation at a temperature and pressure, which exceed the critical temperature and the pressure of the reaction mixture. Then, the polymerisation is said to take place in supercritical conditions. At such conditions the operation temperature often exceeds 90° C., preferably 93° C., depending on the composition of the reaction mixture.

Hydrogen may be introduced into the reactor to control the molecular weight of the polymer. The amount of hydrogen depends on the catalyst used and the desired molecular weight, or melt flow rate MFR, of the polymer. One or more comonomers may also be introduced into the reactor to modify the mechanical properties, density and flexibility of the polymer.

The polymerisation catalyst used in the slurry reactor may be any polymerisation catalyst known in the art. Thus, the catalyst may be a chromium catalyst, as disclosed in e.g. EP 279890 or EP 307907. It may also be a Ziegler-Natta catalyst, such as disclosed in e.g. EP 688794, EP 949274, WO 99/58584 or WO 01/55230. Further, the catalyst may be a metallocene catalyst as disclosed in e.g. WO 97/28170 or WO 00/34341.

The polymer slurry is withdrawn continuously from the reactor through an outlet. Even though the location of the outlet may be selected freely, it is most preferably located at the discharge side of the loop circulation pump. In such a case it may be possible to recycle the lean fluid stream from the screen back into the polymerisation reactor without additional pressurising means.

According to the invention, the polymer slurry is conducted to a screen unit, where the fluid (polymerization diluent) is freed from the main portion of the polymer solids.

As will be discussed in more detail below in connection with the drawings, typically, a screen unit of the present kind includes a vessel, in which the screen—in the form of an essentially planar plate or in the form of a cylindrical tube—forms a partition which separates the inflowing concentrated polymer slurry from the diluted or essentially polymer particle-free effluent. Thus, the screen vessel comprises for example (at least) two compartments separated by the screen: a first compartment for polymer slurry and a second compartment for essentially polymer particle-free effluent. The first compartment is provided with an inlet or nozzle for allowing feed of polymer slurry optionally through a separate conduit from the outlet of the slurry reactor, and with an outlet for withdrawing concentrated polymer slurry. The second compartment has an outlet or nozzle, through which the diluted or even polymer particle-free effluent is withdrawn and recycled to the slurry reactor, optionally via a separate conduit.

It is, however, also possible to place the screen inside the slurry (loop) reactor. Thereby, the removed diluent and fines can be directly mixed with the slurry. The feed is taken from the loop pump discharge and the screen insert can be located on the pump suction side. The lower part of the screen pipe is connected to the continuously operating product outlet valve. The lower part of the screen preferably has an opening to the loop to allow for internal flushing of the screen if the outlet valve is not in use.

Irrespective of their configuration, be it in the form of a plate or a cylinder, the screens used in the present invention should exhibit openings having a size in the range of from 10 to 1000 µm, preferably from 50 to 500 µm, more preferably from 100 to 300 µm and in particular from 100 to 200 µm. If it is desired that no small-size polymer particles shall be returned to the polymerisation reactor with the fluid stream, then a small opening size is preferred. The same is true if the slurry contains a large amount of polymer having a small particle size; this is the case if either the average particle size is small or the particle size distribution is very broad.

However, often it is desirable to recycle a part of the smallest polymer particles into the reactor, and in such cases an opening size of more than 100 μm is recommended. On the other hand, the size of the openings should not be excessively large, to avoid the large particles from passing the screen.

According to the invention, the screen is in particular self-cleaning. For the purpose of the present invention, by "self-cleaning" is meant that the size of the opening is smallest at the point of contact (at the "inflow surface" of the screen) and increases towards the other end (i.e. towards the "outflow surface"). Thereby, any particle that passes the opening 1 of the screen 2 does not become trapped in the opening but passes the screen freely. Such screens are available on the market and are supplied, e.g., by Johnson Screens™. The principle is shown schematically in FIG. 1.

In the context of self-cleaning screens, the expression "size of the opening", as used hereinafter, denotes the smallest size of the slot opening.

Preferably, from 5 to 25% of the area of the screen is covered by the openings, more preferably, from 10 to 20%.

The flow rate of the slurry is preferably 3 to 15 m/s, more preferably 5 to 10 m/s. The flow direction is preferably parallel to the slot openings in the screen.

In a particularly preferred embodiment the screen is arranged in the form of a tube. The slurry to be concentrated flows inside the tube and the fluid escapes through the openings. Consequently, the slurry becomes more concentrated as it passes the tube. In such an arrangement the screen in the form of a tube is placed inside a second tube, into which the fluid passing the screen is collected. The second tube may then be used for collecting or recycling the fluid.

Figure 2:
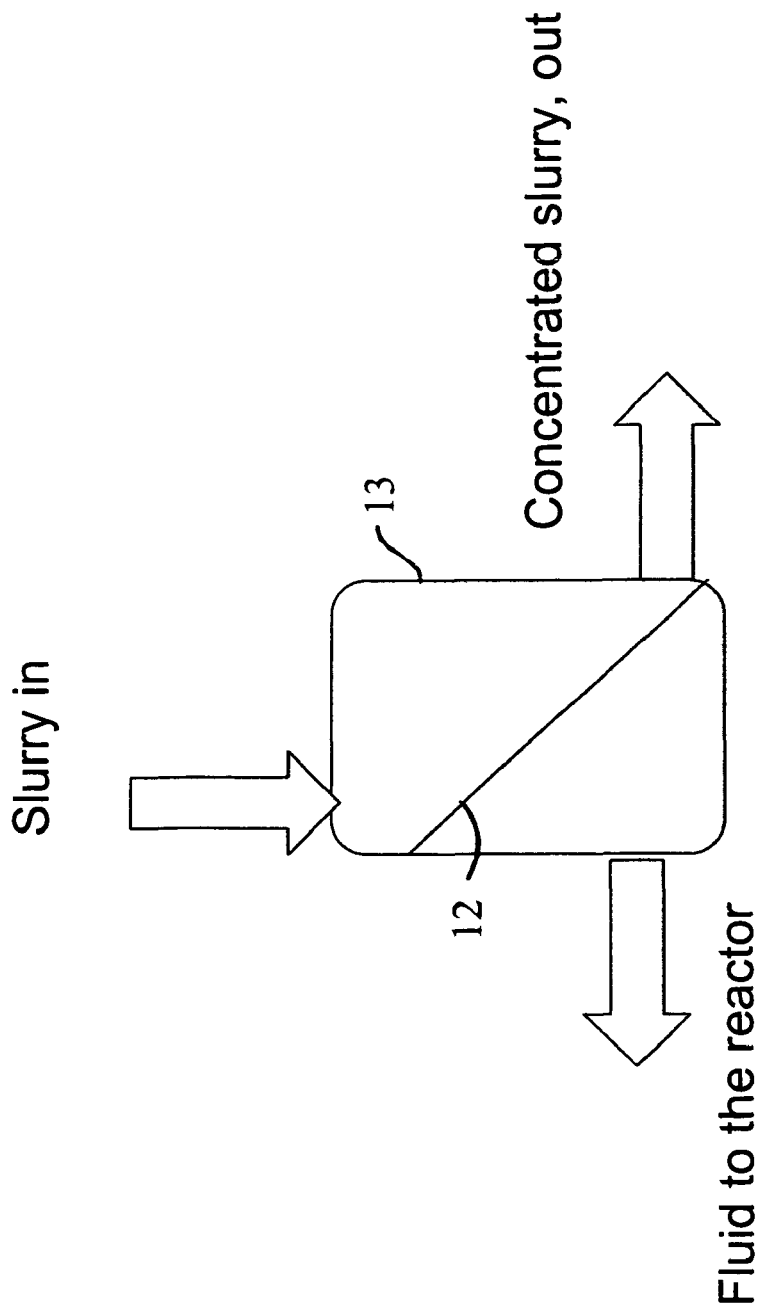
FIG. 2 shows, also in a schematic fashion, the construction of a screen installation, where a flat screen panel is installed within a vessel.

The screen may be used in different installations. FIG. 2 shows one installation, where a flat screen panel 12 is installed within a vessel 13. The slurry entering from the reactor is introduced into the vessel. A part of the fluid may pass from the openings of the screen and is recycled into the reactor. The concentrated slurry remains over the screen and is withdrawn. It may be directed into another polymerisation stage or alternatively it may be passed into further degassing, drying, stabilisation and extrusion stages. If necessary, the recycled fluid stream may be pressurised, e.g. by a pump, to recycle it into the polymerisation reactor. It is also possible to return the recycled fluid stream into the polymerisation reactor indirectly, e.g. after a series of purification and separation steps.

Figure 3:
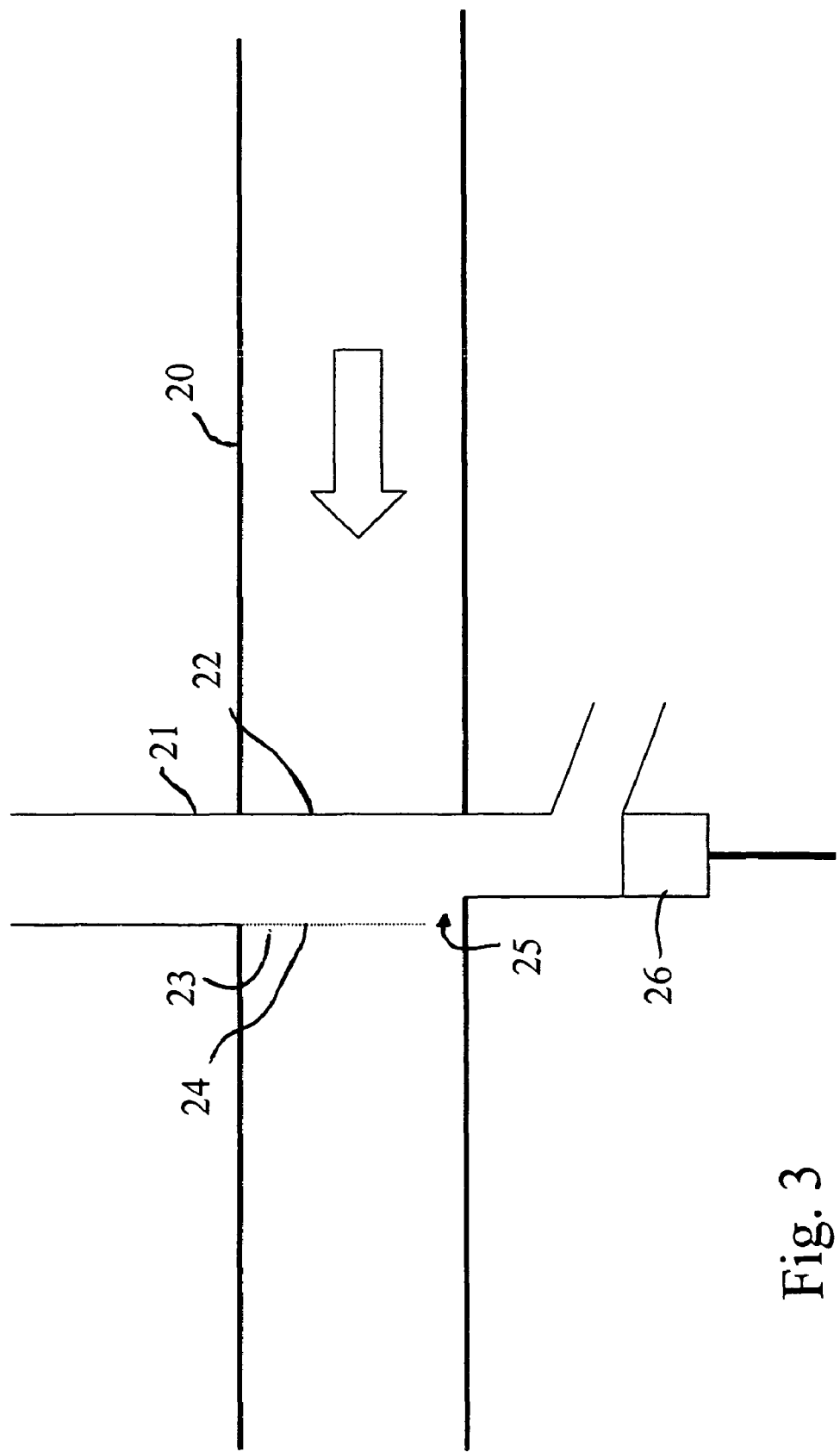
FIG. 3 shows a further preferred embodiment, in which the screen has a cylindrical configuration and is installed inside a pipe connected to the discharge side of a loop pump.

FIG. 3 shows another installation. The slurry is taken out from the discharge side of the loop pump (not shown in the figure). The outlet pipe 21 is taken through the loop reactor 20. The upstream wall 22 of the outlet pipe that faces the direction of flow in the loop reactor is solid. The downstream wall 23 opposite the direction of flow has openings 24, allowing fluid to pass through. The downstream wall is preferably made as internal axial wire construction. The outlet pipe 21 preferably has an opening 25 in the flow space of the loop reactor, at the bottom, for the case that the outlet pipe is not in use. The opening is located on the downstream side of outlet pipe, as shown in FIG. 3. On the upstream side, the wall of the outlet pipe is made to fit closely with the loop reactor wall.

Preferably the outlet valve is equipped with a RAM valve 26, making it possible to close the outlet.

The installation according to FIG. 3 has the advantage that a separate recycle arrangement of the fluid into the loop reactor is not needed.

As was the case above, the concentrated slurry can be directed to any desired subsequent process stage, such as degassing, polymerisation, drying, stabilisation and extrusion, or a combination of such steps.

Figure 4:
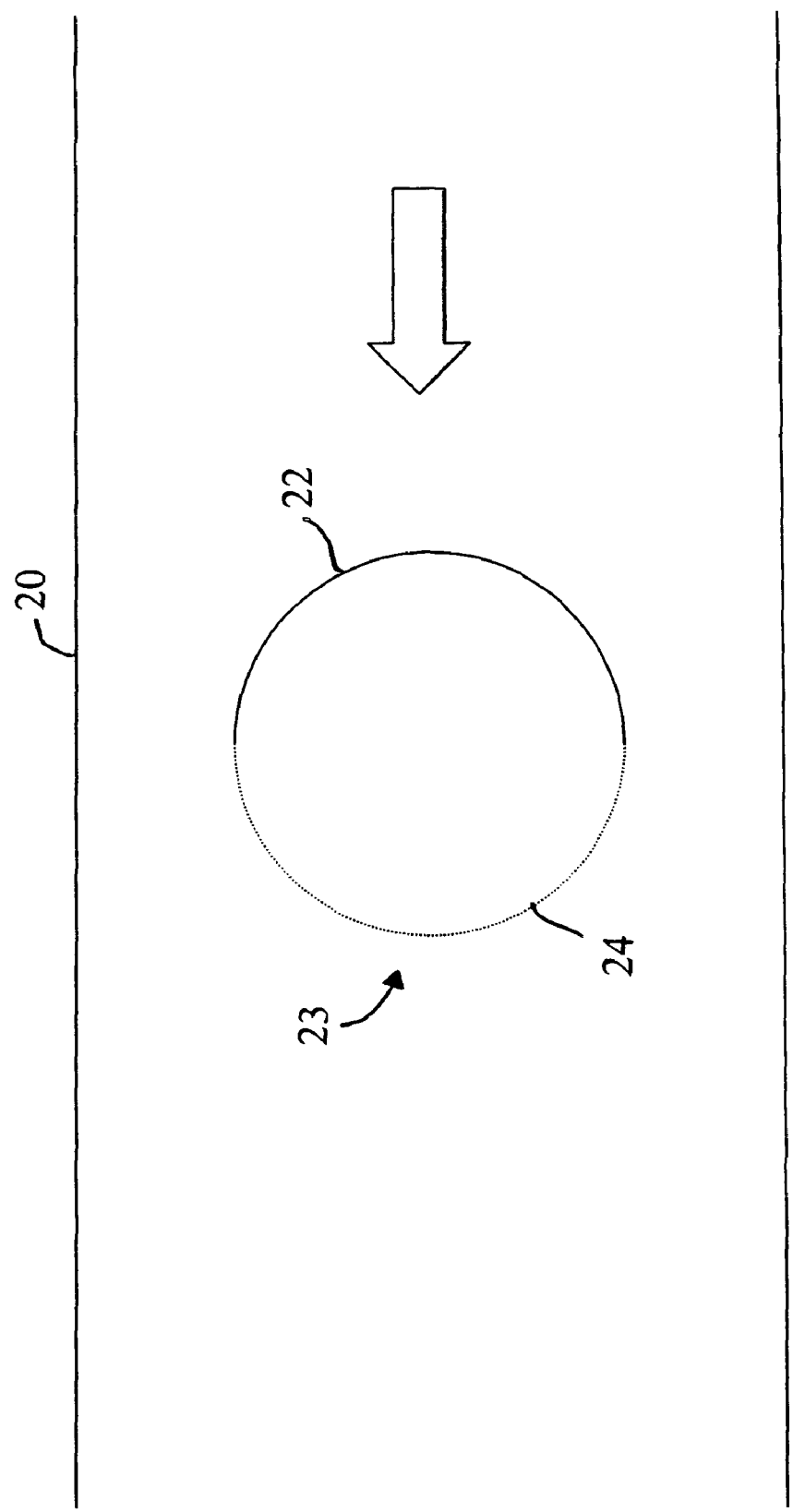
FIG. 4 shows a topview of the embodiment according to FIG. 3.

A top view of the arrangement according to FIG. 3 is shown in FIG. 4.

The solids content of the slurry that is withdrawn from the reactor typically ranges from 10 to 40 vol-%, preferably from 20 to 30 vol-%. The concentrated slurry typically has a content of solids which is at least 20%, preferably at least 50%, in particular at least 100% higher, i.e. from 30 to 55 vol-%, preferably from 35 to 50 vol-%. The fluid stream that passes the screen typically contains less than 10, preferably less than 5 vol-% solids.

It is possible to combine two or more screen units to be used in parallel. This is advantageous if the screen becomes plugged, as then a switch to another unit can be made without stopping the process.

In a preferred case, the screen is used to concentrate the slurry withdrawn from one reactor and the concentrated slurry is directed to another reactor. In such a case, it is often preferred to remove the remaining hydrocarbons in a flash unit. In this way reactants are prevented from being carried over to the subsequent reaction stages.

A slurry reactor operated according to the present invention can be included in a multistage polymerisation sequence comprising one or several slurry reactor(s), which form a cascade with one or several gas phase polymerisation reactor (s), as disclosed in our copending patent application EP 02396161.8, the content of which is herewith incorporated by reference.

In the present context it is briefly noted that the gas phase reactors can be operated at a temperature of from about 60° C. to about 115° C., preferably 70 to 110° C. The operating pressure is from 10 to 30 bar, preferably from 15 to 25 bar. In the gas phase reactor, olefins are is copolymerised with one or more $C_2$ to $C_{10}$ alpha-olefin comonomers, or the olefins like ethylene are homopolymerised. Preferably, the olefins like ethylene are copolymerised in the gas phase reactor with a minor amount of hydrogen to produce a high molecular weight polyethylene copolymer. The reaction mixture contains typically from 5 to 25 mol-% ethylene, from 0.1 to 10 mol-% alpha-olefin comonomers and from 0.01 to 3 mol-% hydrogen. If a single site catalyst is used for ethylene polymerization, then the content of hydrogen may be from 0.001 to 1 mol-%. The remainder is composed of inert components, like nitrogen or propane.

The following non-limiting example illustrates the invention:

EXAMPLE

A 10 $m^3$ loop reactor is operated at 95° C. and 60 bar pressure with propane diluent. Ethylene homopolymer is produced in the reactor by introducing ethylene, diluent, hydrogen and a polymerisation catalyst in such quantities that the diluent contains 5.9 mol-% of ethylene and 2.6 mol-% hydrogen. The remainder is propane with minor quantities (less than 1 mol-% each) of methane, ethane, isobutane and n-butane. The catalyst was prepared according to Example 3 of EP 688794 with the exception that as a carrier material silica having an average particle size of 20 μm was used.

The polymer production is 1.4 tons per hour; the melt index of the polymer is 450 g/10 min and the density 973 kg/$m^3$. The solids content of the slurry is 25 vol-%.

The polymer slurry is withdrawn continuously from the reactor through an outlet nozzle on the discharge side of the loop pump and transferred to a screen unit. The screen consists of a vertical one inch cylindrical inner part with slot openings of 200 micrometers and an outer pipe of 1½ inch (3.81 cm) size. The area of the slot openings represents 15% of the total area of the cylindrical screen. The polymer slurry is fed to the top of the inner cylinder of the screen. The concentrated slurry is withdrawn from the bottom of the inner cylinder in an amount corresponding to the polymer production in the reactor. The flow of diluent through the screen openings is adjusted with a control valve and recycled from the bottom of the 1½ inch (3.81 cm) outer pipe to the suction side of the loop reactor pump.

The slurry flow out of the reactor is 2.7 tons per hour, with 25 vol-% solids. The concentrated slurry flow out of the screen is 1.9 tons per hour and it has a solids content of 42 vol-%. The separated diluent flow, which is recycled into the loop reactor, is 0.8 tons per hour and has a solids content of 1 vol-%.

The invention claimed is:

1. A process for continuously producing olefin polymers in a slurry phase reactor in a hydrocarbon diluent or liquid monomer, said process comprising
    continuously withdrawing from the slurry phase reactor a polymer slurry containing polymer and a fluid phase, which contains hydrocarbons and optionally hydrogen, and
    concentrating the slurry with a self-cleaning screen by removing a part of the fluid phase to provide a concentrated slurry.

2. A process for continuously producing olefin polymers comprising
    continuously introducing at least one olefin, a polymerisation catalyst, and optionally an inert diluent and hydrogen into at least one polymerisation reactor;
    continuously polymerising said at least one olefin in said reactor;
    continuously withdrawing a polymer slurry stream comprising fluid and polymer particles from said reactor;
    passing said withdrawn polymer slurry stream into a process step involving at least one self-cleanig screen, thereby dividing said polymer slurry stream into two streams, where the first stream comprises the concentrated slurry and the second stream comprises mainly fluid, optionally with a minor amount of polymer;
    returning at least a part of said second stream into at least one polymerisation reactor; and
    optionally recycling a part of the concentrated stream to the reactor.

3. The process according to claim 1 or 2, wherein the solids content of the concentrated slurry is 30 to 55%.

4. The process according to claim 1 or 2, comprising using a screen, in which the sizes of the openings are smallest at the inflow surface of the screen and increases towards the outflow surface.

5. The process according to claim 1 or 2, wherein the screen has a planar or cylindrical configuration.

6. The process according to claim 1 or 2, wherein the size of the openings in the screen(s) is within the range of 10 to 1000.

7. The process according to claim 1 or 2, wherein the screen comprises at least one flat screen panel is installed within a vessel.

8. The process according to claim 1 or 2, wherein the screen comprises a cylindrically formed screen, which is placed inside the slurry reactor in such a manner that the removed diluent and any fines can be directly mixed with the loop slurry.

9. The process according to claim 1 or 2, wherein two or more screen units are used in parallel.

10. The process according to claim 1 or 2, wherein olefin polymers are produced in the presence of a catalytic system in a continuously operated multistage polymerisation sequence, comprising one or several slurry reactor(s) in combination with one or several gas phase reactor(s), said reactors forming a cascade.

11. An apparatus for continuously producing olefin polymers comprising, in combination:
    a bulk reactor for polymerizing olefins, with at least one inlet for reactive olefins and an outlet for polymer slurry; and
    a screen unit having a self-cleaning screen with an inflow surface and an outflow surface, dividing the screen unit into a first compartment for polymer slurry and a second compartment for essentially polymer particle-free effluent, said screen unit further having an inlet for polymer slurry and a first outlet for concentrated slurry connected to the first compartment, and a second outlet for polymer particle-free effluent connected to the second compartment.

12. The apparatus according to claim 11, comprising a first conduit, which connects the outlet of the bulk reactor to said inlet of the screen unit, and a second conduit, which connects the second outlet of the screen unit to an inlet to the bulk reactor.

13. The process for continuously producing olefin polymers according to claim 2, wherein said at least one polymerisation reactor comprises a slurry reactor.

14. The process for continuously producing olefin polymers according to claim 2, wherein said at least one polymerisation reactor comprises a loop reactor.

15. The process according to claim 1 or 2, wherein the solids content of the concentrated slurry is 40 to 52% by volume.

16. The process according to claim 1 or 2, wherein the size of the openings in the screen(s) is within the range of 50 to 500 μm.

17. The process according to claim 1 or 2, wherein the size of the openings in the screen(s) is within the range of 100 to 300 μm.

18. The process according to claim 1 or 2, wherein the size of the openings in the screen(s) is within the range of 100 to 200 μm.

* * * * *